United States Patent [19]

Meyering

[11] Patent Number: 5,729,735

[45] Date of Patent: Mar. 17, 1998

[54] REMOTE DATABASE FILE SYNCHRONIZER

[76] Inventor: Samuel C. Meyering, Zandpad 28, 3601 NA Maarssen, Netherlands

[21] Appl. No.: 385,319

[22] Filed: Feb. 8, 1995

[51] Int. Cl.⁶ .................................................. G06F 17/30
[52] U.S. Cl. ............................. 395/610; 395/200.01
[58] Field of Search ............................... 395/154, 700, 395/600, 650, 601, 611, 612, 613, 614, 615, 616, 617, 621, 200.01, 200.02, 200.03, 200.04, 200.05, 200.06, 200.07, 200.08, 608, 609, 610

[56] References Cited

U.S. PATENT DOCUMENTS

| | | | |
|---|---|---|---|
| 4,875,159 | 10/1989 | Cary et al. | 364/200 |
| 5,043,871 | 8/1991 | Nishigaki et al. | 364/200 |
| 5,043,876 | 8/1991 | Terry | 364/200 |
| 5,151,988 | 9/1992 | Yamagishi | 395/600 |
| 5,230,073 | 7/1993 | Gausmann et al. | 395/600 |
| 5,274,802 | 12/1993 | Altine | 395/600 |
| 5,280,612 | 1/1994 | Lorie et al. | 395/600 |
| 5,403,639 | 4/1995 | Belsan et al. | 395/600 |
| 5,418,957 | 5/1995 | Narayan | 395/700 |
| 5,440,677 | 8/1995 | Case et al. | 395/154 |
| 5,488,686 | 1/1996 | Murphy et al. | 395/330 |
| 5,555,371 | 9/1996 | Duyanovich et al. | 395/182.11 |
| 5,560,007 | 9/1996 | Thai | 395/600 |

*Primary Examiner*—Thomas G. Black
*Assistant Examiner*—Ruay Lian Ho
*Attorney, Agent, or Firm*—Cesari and McKenna, LLP

[57] ABSTRACT

A computer system synchronizes data in multiple remote database files with data in a master database file. The system creates the remote files by copying data from the master file. For each remote file created, the system also creates a backup file. The backup file reflects contents of the remote file when the remote file was created or last synchronized, i.e., before a user can modify data in the remote file. From time to time, the system synchronizes data in the master file and a remote file. The system compares corresponding data in the master, remote, and backup files to determine which file (remote or master) has a more current version of the data. The system then updates the file that has the less current data with data from the file that has the more current data. After synchronizing the files, the system copies all data from the remote file to the backup file (or alternately creates a new backup file). The system compares and updates whole records and, when necessary, individual fields within a record.

13 Claims, 7 Drawing Sheets

REMOTE DATABASE FILE SYNCHRONIZER

FIELD OF THE INVENTION

The present invention relates to computer database systems and more particularly to systems that synchronize multiple disconnected copies of a database file, especially when these copies reside on portable/mobile computers.

BACKGROUND OF THE INVENTION

Computer database systems can store and retrieve a wide variety of data in database files. Mobile (portable) computers allow users to take the computers, and database files stored therein, with them as they travel, e.g., to customer sites and on aircraft. These files can maintain, e.g., customer lists, orders, prices and inventory availability. Portable computers pose problems, however, for users and database administrators because all users of a particular database do not simultaneously access a single database file. Typically, each user's portable computer maintains a copy of the database file. One user adding, deleting or modifying data in his/her copy of the database file does not thereby update other users' copies of the database file. After a user changes data within a copy of a database file, the various copies of the database file no longer contain identical data, i.e., they are no longer "synchronized." Unsynchronized copies of the database file can lead to errors because disparate users can get disparate results from identical inquiries of the database.

Developers of prior art systems have attempted to solve the problems associated with multiple copies of a database. For example, they use computer networks to continuously (or at least during an access session) interconnect all computers that store copies of a database file. These developers use the networks to continuously synchronize the various copies of the file. Continuously interconnecting via a network all mobile computers sharing a single database is problematic, however. Interconnection with mobile computers over a cable is not feasible. Interconnecting mobile computers to a network over telephone links is not always feasible or convenient. A wireless interconnection between a mobile computer and a network while a user accesses a database is generally too expensive because an access session is relatively long (up to several hours).

A second prior solution involves splitting a database among its users. Each user's portable computer maintains only a portion of a database that the user anticipates accessing. This solution poses problems, however, because users have no access to data not stored in their computers. In addition, it is not always possible to divide a database into non-overlapping partitions.

A third prior arrangement stores copies of a database file on each portable computer and requires users of the portable computers to mark changes in their respective copies. A manual procedure periodically updates a master database file from each of the portable users' marked-up copies. This procedure is time-consuming and highly error-prone.

It is, therefore, an object of the present invention to provide an improved system that synchronizes data in multiple, portable database files with data in a master database file.

SUMMARY OF THE INVENTION

The present invention, a database synchronizer, utilizes a master computer to maintain a central ("master") database file. The synchronizer copies the master file from the master computer to one or more portable computers. A copied file on a portable computer is herein referred to as a "remote" file. After creating a remote file, but before a user can modify data in it, the synchronizer creates a backup copy of the remote file. The synchronizer maintains the backup file and an association between the backup file and the remote file on the master computer. A portable computer user ("remote user") can then access his/her respective remote file and freely add, delete and modify data in the remote file.

More or less periodically, each remote user links his portable computer to the master computer to synchronize his remote file with the master file. The linkage can be accomplished by any convenient method, e.g. via computer network, telephone, or direct cable connection. The master computer locates the backup file associated with the remote file maintained on the portable computer. The master computer synchronizes the remote file with the master file by updating less current data in each file with more current data from the other file.

"Updating" herein generally means reading a more current record or field from one file and writing it to the other file or, when necessary, deleting an obsolete record from a file. (An alternate treatment of computed records or fields is described below.) After the master computer has updated all data in the master and remote files, it creates a new backup copy of the remote file and deletes the previous backup file. The time at which the master and remote files were "last synchronized" (or simply "the last synchronization") herein refers to the most recent creation of the backup file, including its initial creation, i.e. when the synchronizer created the remote file.

When the master computer synchronizes the remote and master files it compares corresponding data in the remote, backup and master files to ascertain which file (remote or master) has a more current version of the data. It compares and updates whole records and, when necessary, individual fields within a record. If data in a file (master or remote) has changed since the last synchronization, but corresponding data in the other file has not changed, the synchronizer assumes the changed data is more current than the unchanged data. If corresponding data in both the master and remote files have changed since the last synchronization, the database synchronizer can not ascertain which data is more current, so the synchronizer prompts the user to select the more-current data. In either case, the database synchronizer then updates the file that has the less current data from the file that has the more current data.

The synchronizer can ascertain whether data in the remote file has changed since the last synchronization by comparing data in the remote file with corresponding data in the backup file. Data in the remote file has changed if corresponding data in the remote file and the backup file are different (because the backup file contains the same data as the remote file contained when the files were last synchronized).

The synchronizer can ascertain whether data in the master file has changed since the last synchronization by comparing corresponding data in the master file and the remote file's backup file. Data in the master file has changed if corresponding data in the master file and the backup file are different (because the backup file contains the same data as the master file contained when the files were last synchronized).

The synchronizer generally updates less current data by overwriting it with more current data from the other file, deleting a record or adding a record to a file that did not previously contain a corresponding record. The synchronizer can use an alternate method to update computed records or fields. For example, assume that a field represents an available inventory level of a particular good. Users reduce this quantity as they book orders and increase it as they stock more of the good. When the master computer synchronizes the master and remote files, it ascertains which file (remote or master) contains a more current version of the field as described above. The difference between the value in the more current field and the value in the corresponding field in the backup file represents an amount by which the field has changed. The synchronizer adds this difference to the less current field to update the field.

The synchronizer maintains profile information for each remote user in a "profile" file. A remote file can contain a subset of the records and/or fields from a master file. Such a subset can overlap with other other remote files. A user profile indicates which records and fields are included in the user's remote file. The synchronizer uses this profile when it copies a master file to a remote file. A user profile also lists the type of access ("privileges", i.e. no access, read-only, or read-write) a user is granted with respect to each field. The synchronizer uses the list of privileges when it synchronizes a master and a remote file.

BRIEF DESCRIPTION OF THE DRAWINGS

The above and further advantages of the invention may be better understood by referring to the following detailed description, in conjunction with the accompanying drawings, in which.

DETAILED DESCRIPTION OF AN ILLUSTRATIVE EMBODIMENT

Figure 1:
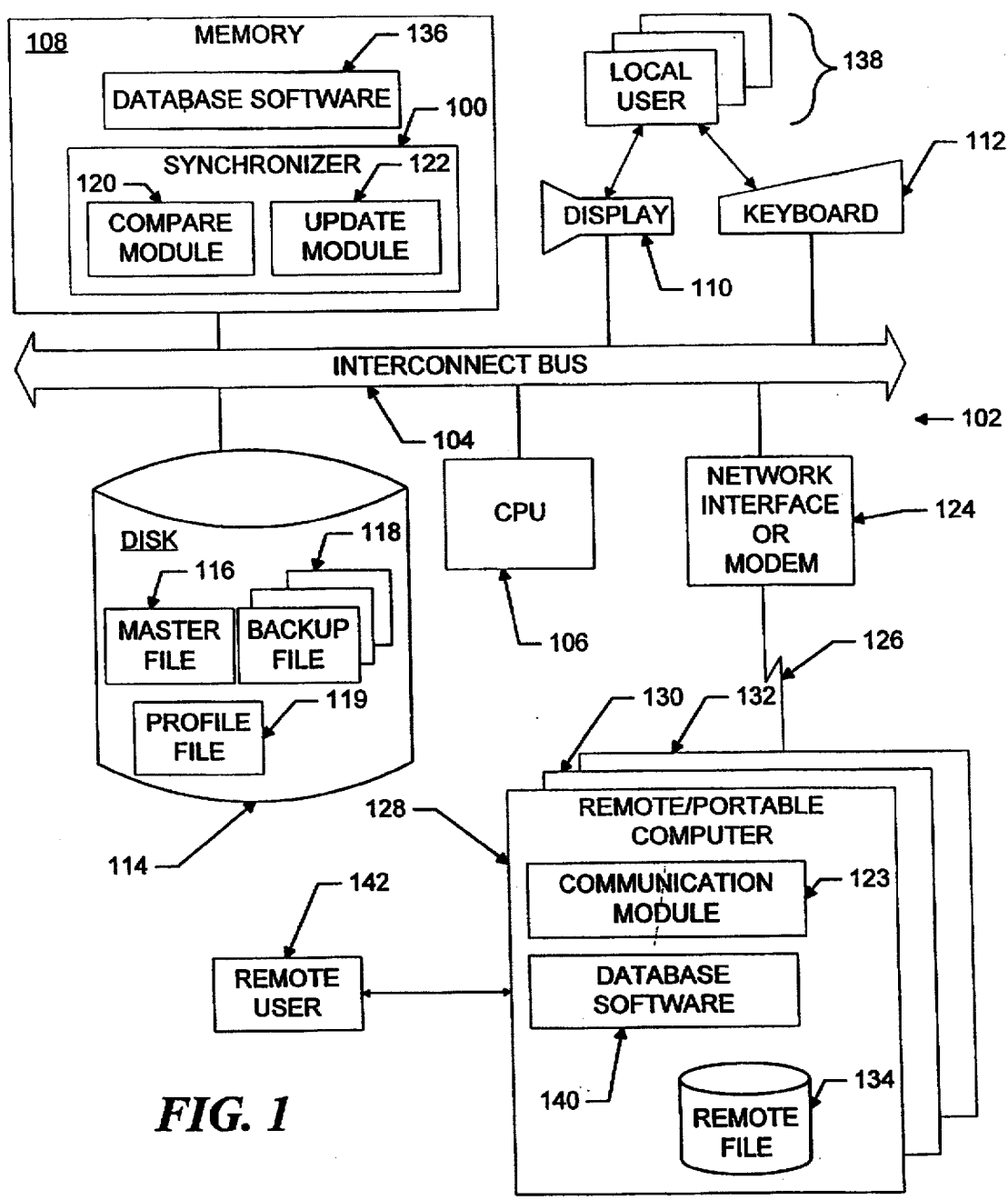
FIG. 1 is a block diagram of a computer system on which the invention can be practiced.

FIG. 1 is a block diagram of a computer system on which synchronizer 100 can run. Master computer 102 is of conventional design, having an interconnect bus 104, central processing unit (CPU) 106, memory 108, display 110 and keyboard 112. Master computer 102 has a disk 114 or other mass storage device for storing master file 116, backup file 118 and profile file 119. Synchronizer 100 resides in memory 108 and comprises compare module 120 and update module 122. Well-known virtual memory systems make it possible for portions of synchronizer 100 to reside in (be "paged out" to) disk 114 at any given time. Master computer 102 also has a network interface or modem 124 by which it can communicate with other computers over communication link 126. Remote/portable computers 128–132 are of conventional design and each can, from time to time, interconnect and communicate with master computer 102 over communication link 126. Remote computer 128 maintains remote file 134. Database software 136 allows local users 138 to access master file 116, e.g. via display 110 and keyboard 112. Similarly, database software 140 allows remote user 142 to access remote file 134 on remote computer 128.

FIG. 1 shows synchronizer 100 as being separate from database software 136. Alternately, synchronizer 100 can be implemented within database software 136. Similarly, communication module 123 can be separate from or implemented within database software 140.

Figure 2:
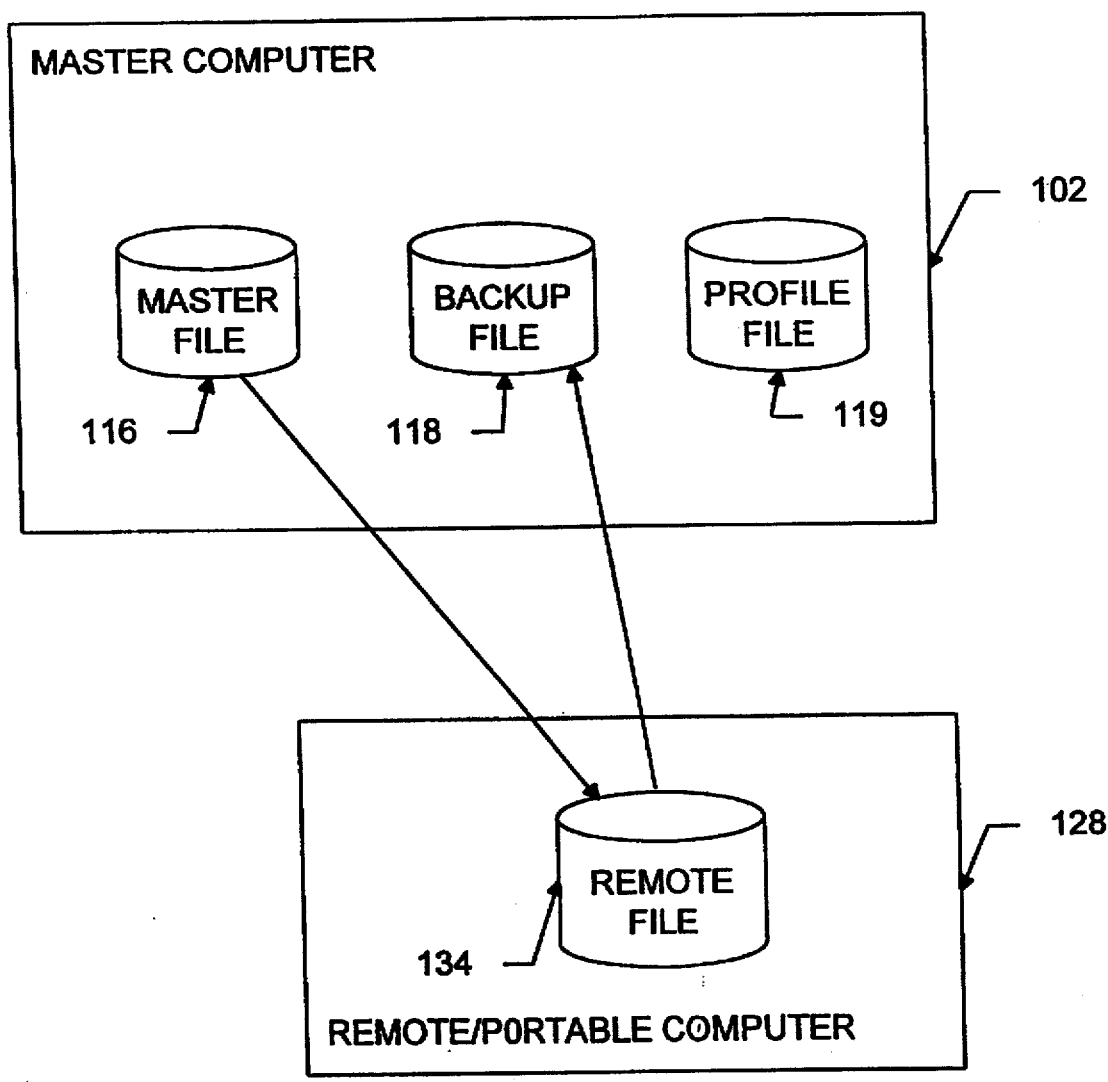
FIG. 2 is a block diagram of data flows between a master computer and a remote computer when the master computer creates a remote file and its backup file.

Synchronizer 100 performs fundamentally different functions during three discrete phases. In the first phase, master computer 102 is linked via communication link 126 to remote computer 128. Synchronizer 100 communicates via communication module 123 with database software 140. As shown in FIG. 2, synchronizer 100 uses a user profile in profile file 119 to select records and fields in master file 116 and copy them to remote file 134 on remote computer 128. After creating remote file 134, but before a remote user can access any data in the remote file, synchronizer 100 creates backup file 118 by copying remote file 134 from remote computer 128 to backup file 118 on master computer 102.

Figure 3:
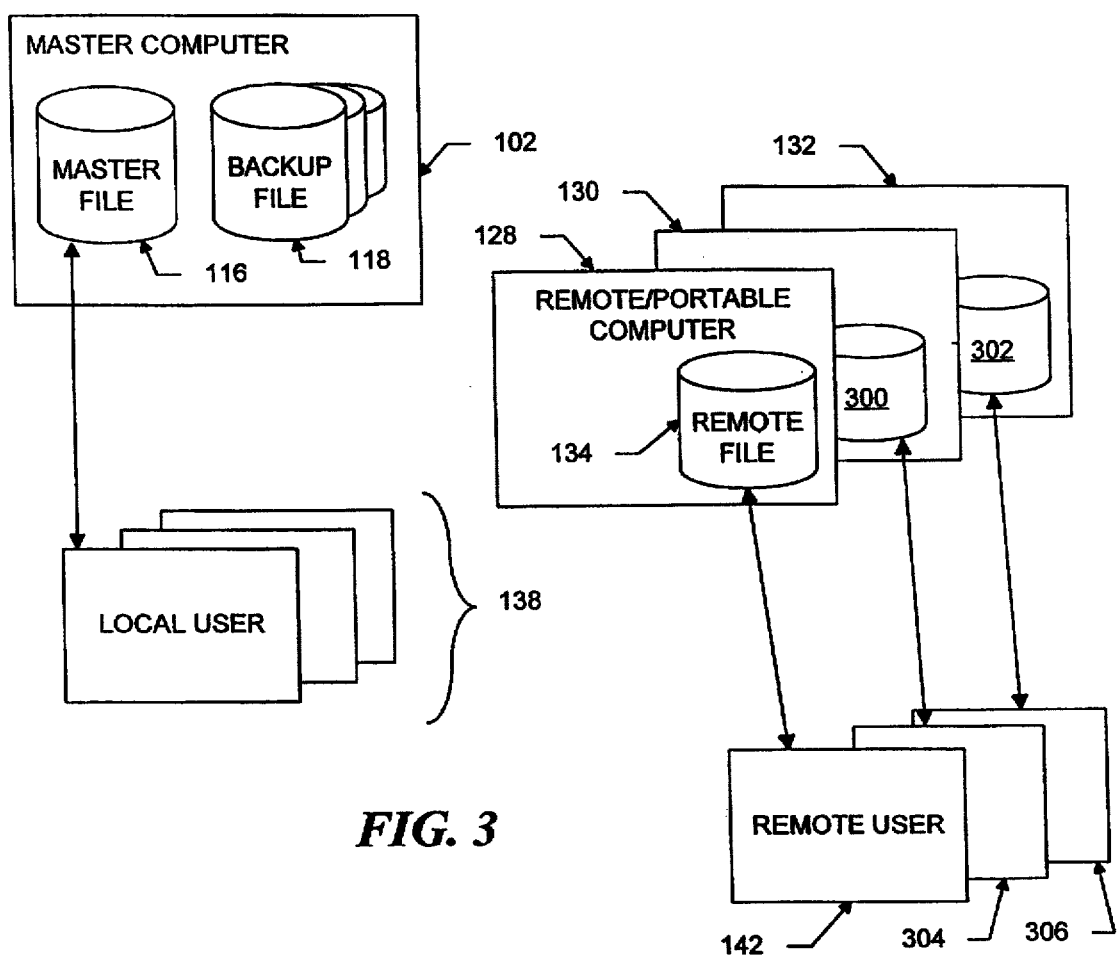
FIG. 3 is a block diagram of data flows between local users and the master file and between remote users and their respective remote files.

During the second phase, communication link 126 is broken, remote computer 128 can be moved about, and synchronizer 100 is quiescent. As shown in FIG. 3, during the second phase, remote user 142 can access remote file 134 on remote computer 128. Remote computers 130 and 132 have similarly created remote files 300 and 302. Remote users 142, 304 and 306 can freely add, delete and modify records and fields within records in their respective remote files 134, 300 and 302. Meanwhile, local users 138 can add, delete and modify records and fields within records in master file 116 on master computer 102.

Figure 4:
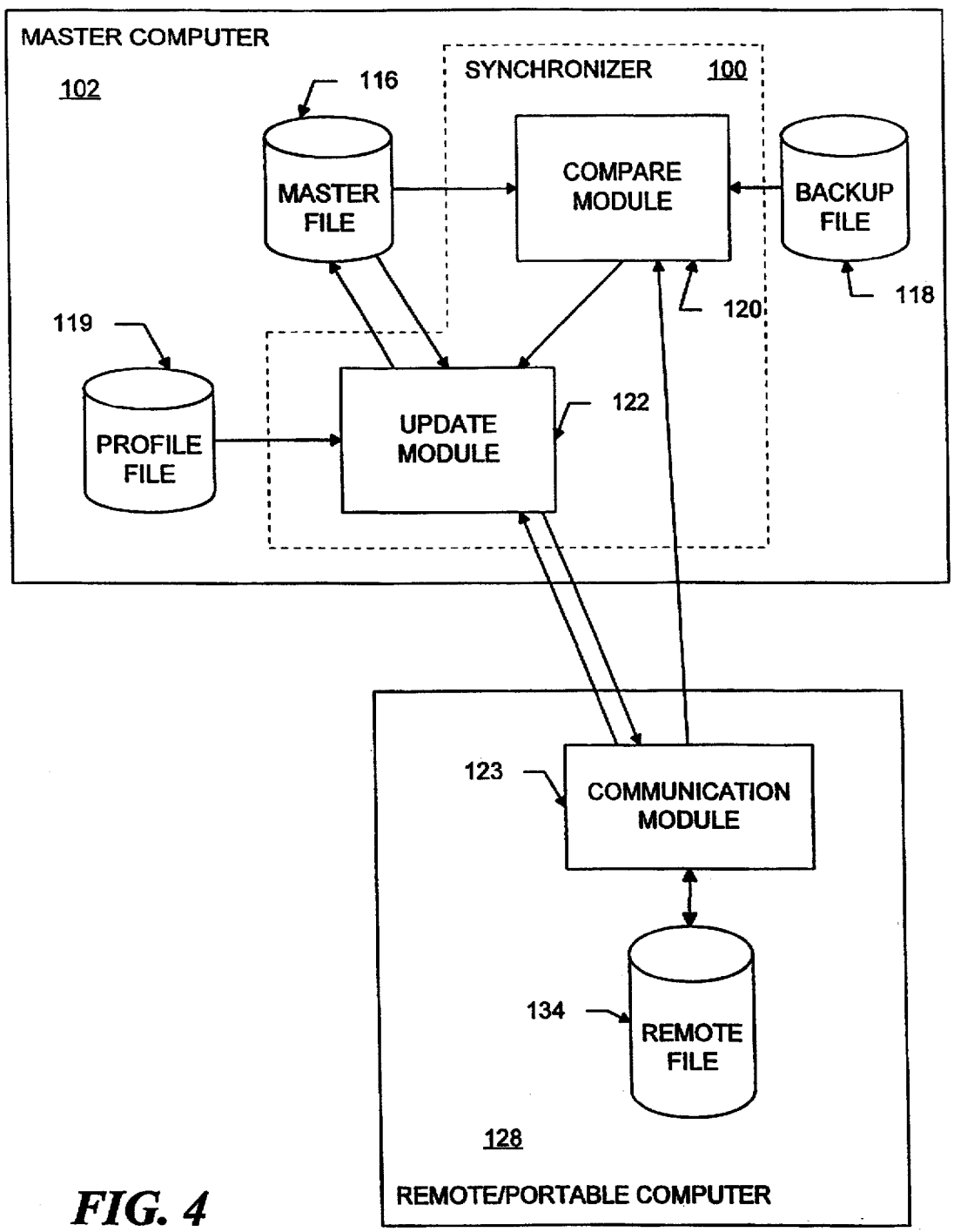
FIG. 4 is a block diagram of data flows when the master computer synchronizes the remote file and the master file.
Figure 5A:
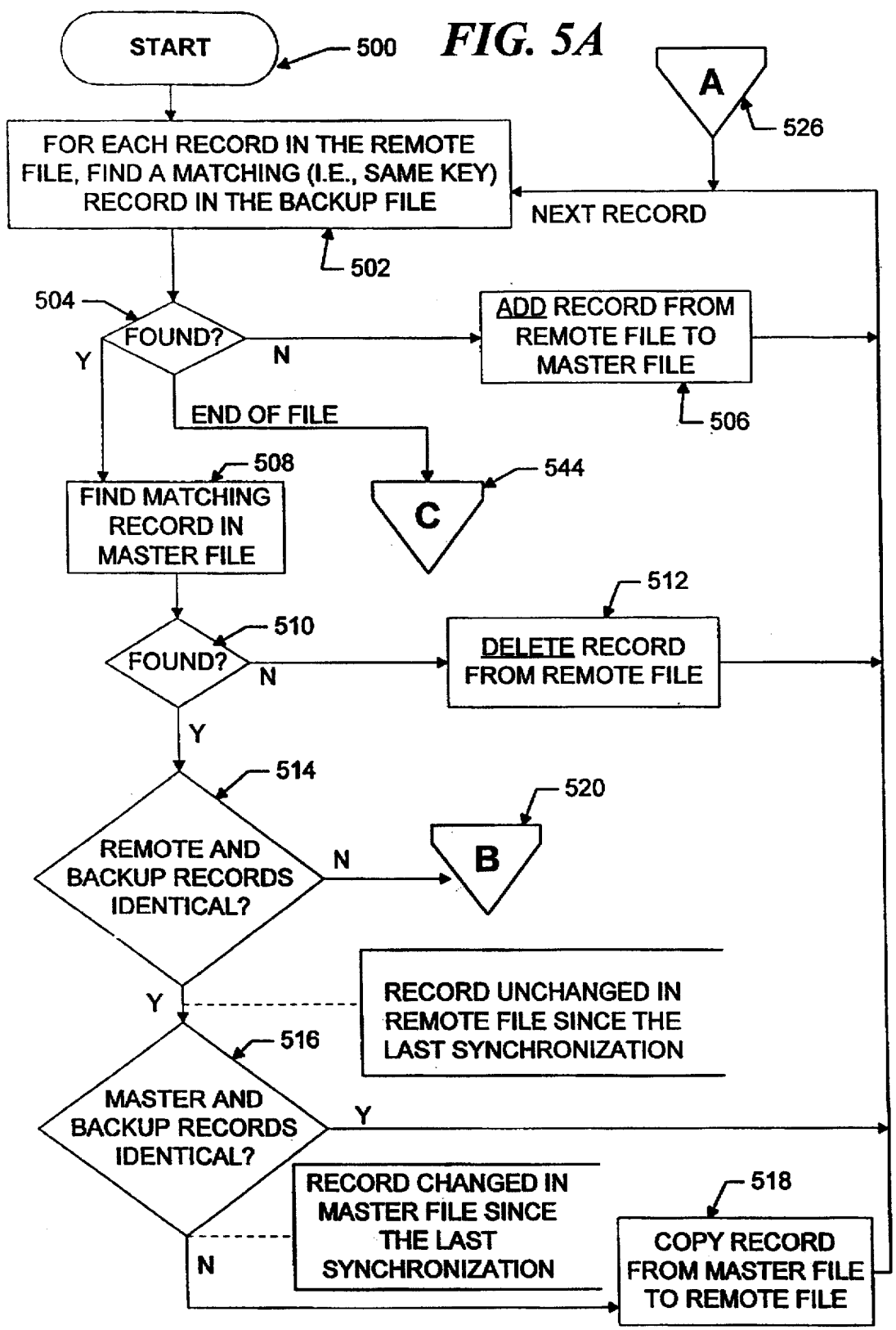
FIGS. 5A–C are a flow chart that illustrates steps taken by the master computer when it synchronizes the remote and the master file.
Figure 5B:
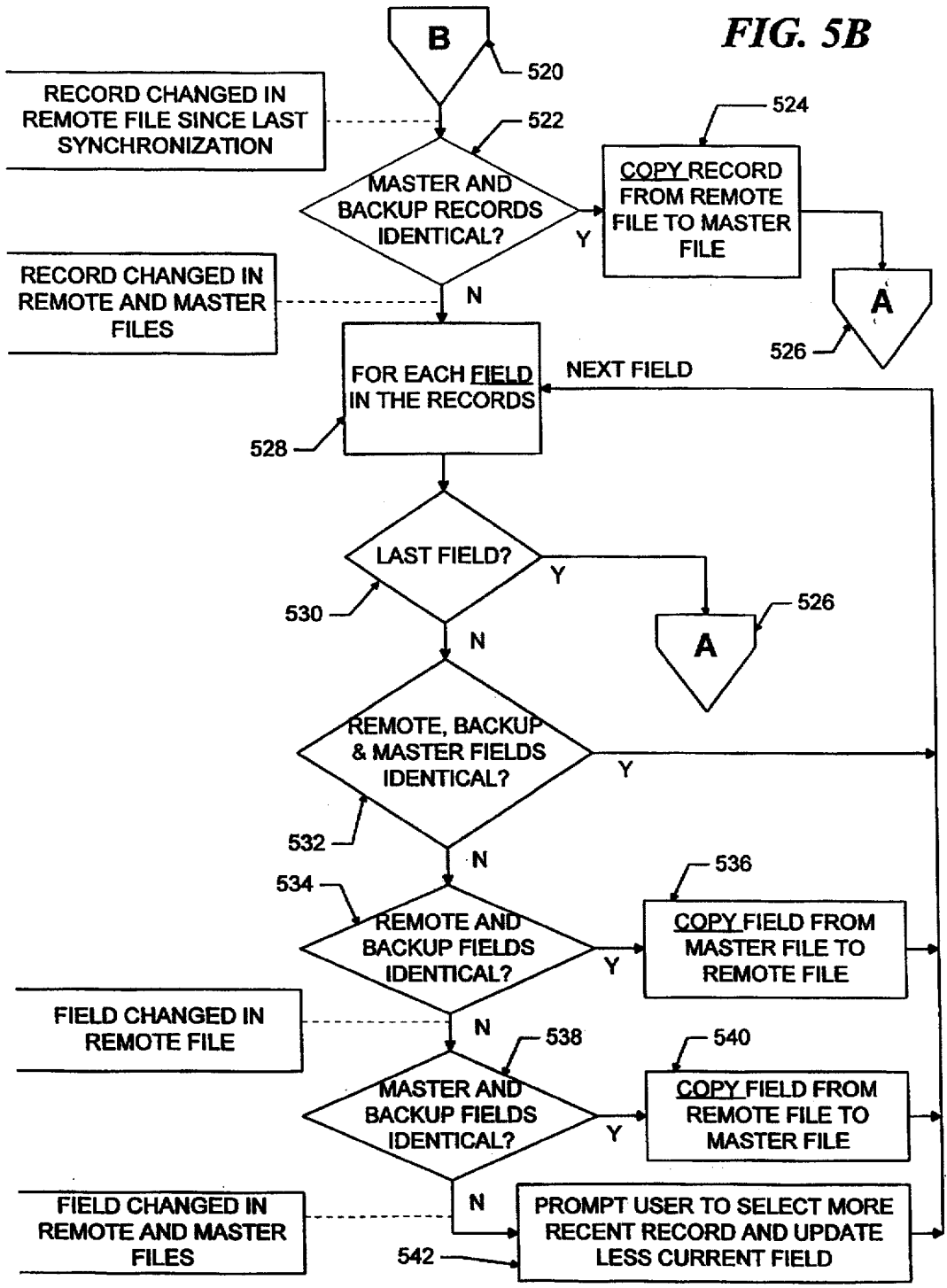
Figure 5C:
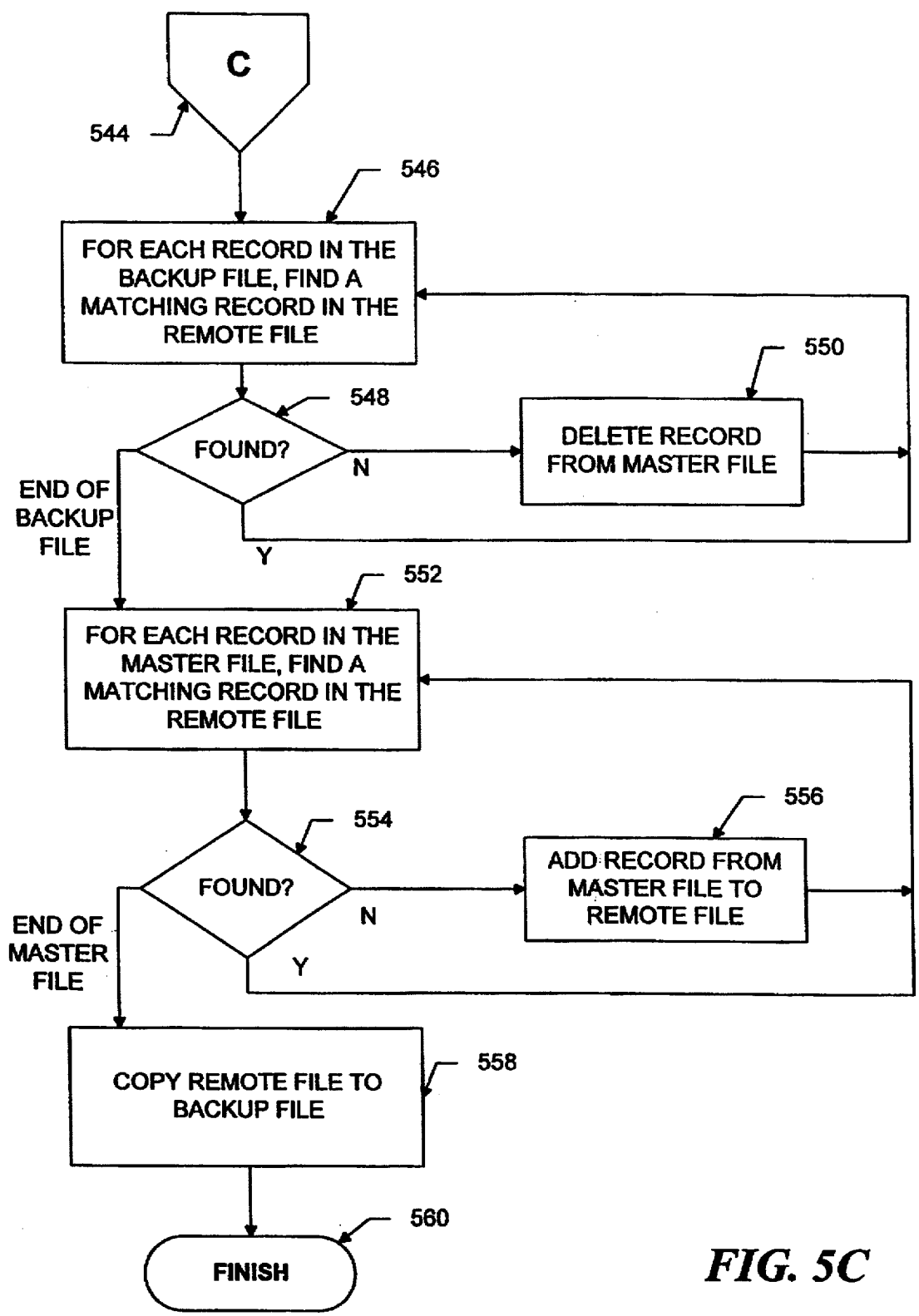

From time to time, each remote user again links his/her remote computer via communication link 126 to master computer 102 (FIG. 1 ) to synchronize his/her remote file with master file 116. Again, synchronizer 100 communicates via communication module 123 with database software 140 and, thereby, can access remote file 134. As shown in FIG. 4, during the third phase, compare module 120 compares data in master file 116 with corresponding data in remote file 134 and backup file 118. Compare module 120 ascertains whether data in master file 116 or corresponding data in remote file 134 is more current. To the extent permitted by a user's privileges as recorded in profile file 119, update module 122 updates the less current of remote file 134 and master file 116 with data from the more current of the two files. In the following description, e.g. step 506 in FIG. 5A, the synchronizer adds, deletes, or updates a record or field in master file 116 only if the user's privileges permit write access. Synchronizer 100 processes each record in the remote, backup, and master files. The flowchart in FIGS. 5A–C illustrate steps taken by synchronizer 100 during the third (synchronizing) phase.

PROCESSING RECORDS IN THE REMOTE FILE

Each record in remote file 134 falls into one of three categories: 1) the record is unchanged since the last synchronization, 2) the record has changed since the last synchronization, in which case synchronizer 100 updates the corresponding record in master file 116, or 3) the record was added to remote file 134 since the last synchronization, in which case synchronizer 100 adds the record to master file 116. Synchronizer 100 begins at start step 500 in FIG. 5A. At step 502, synchronizer 100 begins a loop. It categorizes each record in remote file 134 by searching backup file 118 for a matching record. "Matching" records have corresponding key fields with identical contents but corresponding non-key fields can contain different contents. If synchronizer 100 does not find a matching record in the backup file at decision step 504, then the record in remote file 134 was added since the last synchronization. At step 506, synchronizer 100 adds the record from remote file 134 to master file 116. Synchronizer 100 then loops back to step 502 to read the next record in the remote file.

At decision step 504, if synchronizer 100 finds a matching record in backup file 118, then both the master and remote files contained the record when the files were last synchronized. Synchronizer 100 proceeds to step 508 and attempts to find a matching record in master file 116. If synchronizer 100 does not find a matching record in master file 116 at decision step 510, then the record was deleted from the master file since the last synchronization. At step 512, synchronizer 100 deletes the record from the remote file and loops back to step 502.

If synchronizer 100 finds a matching record in the master file at decision step 510, it proceeds to decision step 514. At decision step 514, if matching records retrieved from the remote and backup files are "identical," i.e., all corresponding fields contain identical contents, then the record in remote file 134 has not changed since the last synchronization. The synchronizer proceeds to decision step 516. At decision step 516, if matching records in the master and the backup files are identical, then the record in master file 116 has not changed since the last synchronization. The synchronizer simply loops back to step 502. On the other hand, if matching master and backup records are not identical, then the record in master file 116 has changed. At step 518, synchronizer 100 copies the record from master file 116 to remote file 134 and then loops back to step 502.

At decision step 514, if matching records in the backup and remote files are not identical, then the record in master file 116 has changed since the last synchronization. Synchronizer 100 proceeds to off-page reference "B" 520. In FIG. 5B, off-page reference "B" 520 leads to decision step 522. If the matching records in the master and backup files are identical, then the record in remote file 134 has changed but the matching record in master file 116 has not changed since the last synchronization. At step 524, synchronizer 100 copies the record from remote file 134 to master file 116 and loops back via off-page reference "A" 526 to step 502 (FIG. 5A).

At decision step 522, if the matching records in the master and backup files are not identical, then the records in both the remote and master files have changed since the last synchronization. Synchronizer 100 processes each field in the record. Synchronizer 100 updates a less current field in the master or remote file from a more current field in a matching record in the other file. Note that both files' records can simultaneously contain fields that are more current than corresponding fields in the other file's record because a remote user could have changed a field in the remote file and a local user could have changed a different field in the matching record in the master file. (Alternately, synchronizer 100 could have changed a field in the master file as a result of synchronizing the master file and some other remote file.)

At step 528, synchronizer 100 begins a loop processing each field in the record. At decision step 530, synchronizer 100 transfers via off-page reference "A" 526 back to step 502 (FIG. 5A) after processing the last field. At decision step 532, synchronizer 100 compares contents of corresponding fields in records in the remote, backup and master files. If all three fields are identical, the synchronizer loops back to step 528 and then processes the next field in the record. At decision step 534, if corresponding fields in the records from the remote and backup files are identical, the field has not changed in remote file 134. At step 536, synchronizer 100 copies the field from master rite 116 to remote file 134 and loops back to step 528. If the corresponding fields in the remote and backup records are different, then the field has changed in remote file 134. At decision step 538, if corresponding fields in the master and backup files are the same, then the field has changed in remote file 134 but not in master file 116. At step 540, synchronizer 100 copies the field from remote file 134 to master file 116 and loops back to step 528. If corresponding fields in the master and backup files are different, then the field has changed in both files. At step 542, synchronizer 100 prompts a user to select the more current field or record. Synchronizer 100 then updates the less-current field and then loops back to step 528. When synchronizer 100 has processed all the records in the remote file, it detects an end-of-file condition at decision step 504 (FIG. 5A) and transfers, via off-page reference "C" 544, to FIG. 5C.

PROCESSING RECORDS IN THE BACKUP FILE

Synchronizer 100 processes each record in backup file 118 to detect deletions from remote file 134 since the last synchronization. If a record exists in the backup file but no matching record exists in the remote file, then a remote user deleted the record from the remote file.

At step 546, synchronizer 100 begins a loop processing each record in backup file 118. For each record in the backup file, synchronizer 100 searches for a matching record in remote file 134. At decision step 548, if synchronizer 100 finds a matching record, then the record was not deleted from the remote file. The synchronizer simply loops back to step 546 to process the next record in the backup file. If synchronizer 100 does not find a matching record at decision step 548, then the record was deleted from remote file 134. Synchronizer 100 deletes the record from master file 116 at step 550 and then loops back to step 546. When synchronizer 100 reaches the end of the backup file at decision step 548, it transfers to step 552.

PROCESSING RECORDS IN THE MASTER FILE

Synchronizer 100 processes each record in master file 116 to detect additions to the master file since the last synchronization. If a record exists in the master file but no matching record exists in the remote file, then a local user added the record to the master file but no remote user added a matching record to the remote file. (Alternately, synchronizer 100 added the record as a result of synchronizing the master file and some other remote file.)

At step 552, synchronizer 100 begins a loop processing each record in master file 116. For each record in the master file, synchronizer 100 searches for a matching record in remote file 134. At decision step 554, if synchronizer 100 finds a matching record, then it simply loops back to step 552 to process the next record in the master file. If synchronizer 100 does not find a matching record at decision step 554, then the record was added to master file 116. At step 556, synchronizer 100 adds the record to master file 116 from remote file 134 and then loops back to step 552.

When synchronizer 100 reaches the end of the master file, decision step 554 transfers control to step 558. At step 558, synchronizer 100 copies all of remote file 134 to backup file 118, essentially creating a new backup file. The synchronizer finishes at step 560. At this point, remote file 134 and master file 116 are synchronized and new backup file 118 reflects the contents of remote file 134. Communication link 126 between portable computer 128 and master computer 102 is broken and the situation is again as depicted in FIG. 3.

It will be understood that the invention is useful for synchronizing files other than database files. For example, it can be used to synchronize diary files, in which dates and/or times are used as keys; spreadsheets, in which row and column numbers are used as keys; and text files, which have no keys. Furthermore, numerous changes can be made in the system specifically described herein without departing from the scope of the invention. For example, the invention treats lines of text in an unkeyed file as records and the invention uses well-known pattern-watching algorithms to ascertain whether two lines of text "match" in the sense used herein.

What is claimed is:

1. Apparatus for synchronizing a master file and a remote file, the apparatus comprising:
   (a) a backup file reflecting contents of the remote file at an earlier time;
   (b) comparing means for ascertaining relative currency of data in the master file and corresponding data in the remote file by comparing corresponding data in the master, remote, and backup files; and
   (c) updating means cooperating with the comparing means for:
      (i) updating the remote file when data in the master file is more current than corresponding data in the remote file; and
      (ii) updating the master file when data in the remote file is more current than corresponding data in the master file.

2. The synchronizing apparatus defined in claim 1, wherein the updating apparatus:
   (a) copies data from the master file to the remote file when data in the backup file is identical to matching data in the remote file and different than matching data in the master file;
   (b) copies data from the remote file to the master file when data in the backup file is identical to matching data in the master file and different than matching data in the remote file;
   (c) deletes data from the remote file when data in the remote file matches data in the backup file and is absent from the master file;
   (d) deletes data from the master file when data in the backup file matches data in the master file and is absent from the remote file;
   (e) adds data from the remote file to the master file when data in the remote file is absent from the backup file; and
   (f) adds data from the master file to the remote file when data in the master file is absent from the remote file.

3. The synchronizing apparatus defined in claim 2, wherein the updating means comprises:
   (1) means for calculating a first difference between data in the master file and corresponding data in the backup file and for adding the first difference to corresponding data in the remote file; and
   (2) means for calculating a second difference between data in the remote file and corresponding data in the backup file and for adding the second difference to corresponding data in the master file.

4. The synchronizing apparatus defined in claim 3, further comprising means for copying, after the updating means updates the remote file and the master file, data from the remote file to the backup file.

5. The synchronizing apparatus defined in claim 3, further comprising means for creating a new backup file, after the updating means updates the remote file and the master file, by copying data from the remote file to the new backup file, and for substituting the new backup file for the backup file in subsequent operations of the comparing means and the updating means.

6. The synchronizing apparatus defined in claim 2, wherein:
   (a) data in the master, remote, and backup files comprise records;
   (b) the records comprise fields;
   (c) the comparing apparatus compares corresponding fields in the master, remote and backup files; and
   (d) when the updating apparatus writes to a file the updating apparatus writes to fields of records that require updating without writing remaining fields of the record.

7. The synchronizing apparatus defined in claim 2, further comprising means
for maintaining a profile information in a "profile file" for each of said remote files, said profile file indicating which records and fields of the master file are included in the associated remote file and further maintaining access privileges granted with each of said fields.

8. A method of synchronizing a master file and a remote file, comprising the steps:
   (a) copying data from the master file to the remote file;
   (b) copying, from the remote file to a backup file, all the data copied in step (a);
   (c) after steps (a) and (b) are complete, comparing corresponding data in the master, remote and backup files and ascertaining relative currency of data in the master file and corresponding data in the remote file;
   (d) updating the remote file when data in the master file is more current than corresponding data in the remote file; and
   (e) updating the master file when data in the remote file is more current than corresponding data in the master file.

9. The method defined in claim 8, wherein step (d) comprises the steps:
   d1) copying data from the master file to the remote file when data in the backup file is identical to matching data in the remote file and different than matching data in the master file;
   (d2) deleting data from the remote file when data in the remote file matches data in the backup file and is absent from the master file; and
   (d3) adding data from the master file to the remote file when data in the master file is absent from the remote file; and wherein step (e) comprises the steps:
   (e1) copying data from the remote file to the master file when data in the backup file is identical to matching data in the master file and different than matching data in the remote file;
   (e2) deleting data from the master file when data in the backup file matches data in the master file and is absent from the remote file; and
   (e3) adding data from the remote file to the master file when data in the remote file is absent from the backup file.

10. The method defined in claim 8, further comprising the step:

(f) after steps (d) and (e) are complete, copying data from the remote file to the backup file.

11. The method defined in claim 8, further comprising the step:

(f) after steps (d) and (e) are complete, creating a new backup file, copying data from the remote file to the new backup file, and replacing the backup file with the new backup file.

12. The method defined in claim 8, further comprising the step of maintaining a profile information in a "profile file" for each of said remote files, said profile file indicating which records and fields of the master file are included in the associated remote file and further maintaining access privileges granted with each of said fields.

13. The method defined in claim 8, wherein step (c) further comprises:

(1) calculating a first difference between data in the master file and corresponding data in the backup file and for adding the first difference to corresponding data in the remote file; and (2) calculating a second difference between data in the remote file and corresponding data in the backup file and for adding the second difference to corresponding data in the master file.

* * * * *